United States Patent [19]

Vokurka

[11] Patent Number: 5,104,216
[45] Date of Patent: Apr. 14, 1992

[54] PROCESS FOR DETERMINING THE POSITION AND THE GEOMETRY OF WORKPIECE SURFACES

[75] Inventor: Franz Vokurka, Vienna, Austria

[73] Assignee: IGM Industriegerate- und Maschinenfabriksgesellschaft mbH, Wr. Neudrof, Austria

[21] Appl. No.: 633,171

[22] Filed: Dec. 28, 1990

Related U.S. Application Data

[63] Continuation of Ser. No. 279,937, Dec. 5, 1988, abandoned, which is a continuation-in-part of Ser. No. 907,489, Sep. 15, 1986, abandoned.

[51] Int. Cl.$^5$ ............... G01B 11/24; G01B 11/30; G23K 9/12
[52] U.S. Cl. ........................... 356/2; 356/376
[58] Field of Search .................. 356/1, 4, 2, 376; 382/22; 358/88, 107

[56] References Cited

U.S. PATENT DOCUMENTS

| | | | |
|---|---|---|---|
| 2,786,096 | 3/1957 | Palmer | 358/107 |
| 3,894,802 | 7/1975 | Higgins | 356/4 |
| 3,918,816 | 11/1975 | Foster et al. | 356/2 |
| 4,004,852 | 1/1977 | Pentecost | 356/1 |
| 4,178,098 | 12/1979 | Asano et al. | 356/1 |
| 4,490,617 | 12/1984 | Loose | 356/386 |
| 4,666,303 | 5/1987 | Pryor | 356/375 |
| 4,695,156 | 9/1987 | Taft | 356/376 |
| 4,842,411 | 6/1989 | Wood | 356/376 |
| 4,858,157 | 8/1989 | Murai et al. | 356/376 |

FOREIGN PATENT DOCUMENTS

| | | |
|---|---|---|
| 0108599 | 5/1984 | European Pat. Off. . |
| 0116798 | 8/1984 | European Pat. Off. . |
| 0134597 | 3/1985 | European Pat. Off. . |
| 2356491 | 12/1977 | Fed. Rep. of Germany . |
| 115079 | 9/1981 | Japan ................. 382/22 |
| 58-187265 | 11/1983 | Japan . |
| 59-210309 | 11/1984 | Japan . |
| 61-49774 | 3/1986 | Japan . |
| 2129640 | 5/1984 | United Kingdom ............ 356/2 |
| 2157851 | 10/1985 | United Kingdom . |

OTHER PUBLICATIONS

"Autofokus aktuell: Schritte zur Scharfe", *Fotoheft*, vol. 8, Aug. 1985, by H. Gottfried, pp. 52-56.

*Primary Examiner*—Richard A. Rosenberger
*Attorney, Agent, or Firm*—Young & Thompson

[57] ABSTRACT

In the determination of the position and geometry of workpiece surfaces, especially weld grooves in automatic arc welding, the workpiece surface or a section thereof, is imaged from two different observation points onto two image pickups. This is so that mutually shifted images of the workpiece surface are reproduced on the two image pickups. This is as well as from the position and the spacing of the defined points of the workpiece surface on the two image pickups. The position of these defined points within the spatial coordinate system of the measuring device is calculated in order to then determine from the position of all calculated points the geometry of the workpiece surface as well as the position of the latter with respect to the observation system.

11 Claims, 6 Drawing Sheets

PROCESS FOR DETERMINING THE POSITION AND THE GEOMETRY OF WORKPIECE SURFACES

This application is a continuation of application Ser. No. 279,937, filed Dec. 5, 1988, now abandoned, which application is a continuation-in-part of application Serial No. 06/907,489 filed Sept. 15, 1986, now abandoned.

BACKGROUND OF THE INVENTION

The invention relates to a process for determining the position and geometry of workpiece surfaces, especially of weld grooves in automatic arc welding.

The utilization of automatic arc welding machines involves a number of problems. Although arc welding machines are able to travel very accurately within predetermined tracks, it is often not possible to manufacture welded workpieces with the required accuracy. This is uneconomical in many instances and, in view of the required accuracy of the final product, unnecessary. Therefore, the economical use of an automatic welding machine requires a device for detection of the actual position, and frequently detection of the geometry of the weld seam, with the aid of which the programmed track data and welding parameters can be provided with correspondence.

BRIEF DESCRIPTION OF THE PRIOR ART

Initial attempts for solving this problem are known. One of them is to approach the problem with passive vision. Due to the complexity of this approach, all trials were done just for square vision tasks or, in case of three dimensional vision problems, for very simple geometry where the amount of calculations is acceptable.

On the other hand, there already exist many solutions based on active vision offering good results. These solutions are in all cases realized by directing a sharply focused light beam (typically a laser beam) onto the workpiece at a specific angle with respect to the axis of the optical detection system. Sensing the displacement of the point of impingement from the neutral position within the image plan provides a measure for the distance of the impinged-upon area with respect to the sensor system. In spite of the use of excellent light sources (lasers) and suitable optical filters, these methods display the deficiency that the receiving systems, on account of dirty workpiece surfaces and workpiece structures which cause scattering and reflections of the sensor beam and of the light from the arc, yield such highly disturbed measuring data that the function can be maintained only by means of plausibility controls and predictions which are not in all cases absolutely correct.

EP Al-0 134 597 (N.V. Optische Industrie, Delft) discloses such a process for measuring with the aid of a focused light beam. Disturbing influences by reflections of the workpiece surface outside the measuring range can be avoided by a certain arrangement of the beam and also of the beam deflection, to a linear image pickup of a line perpendicular with the workpiece. However, errors are also caused in this principle by reflections from the section of the workpiece surface lying within the measuring range. Therefore, additional steps must be taken for differentiating between erroneous and correct signals. These steps include, for example, providing two optical pickup units projecting the illuminated area of the workpiece surface onto two image pickups, or providing a combined image, a specific wavelength, or a specific configuration of the measuring beam, and so on.

In all of these conventional systems, a focused light beam (preferably a laser beam) is directed from the measuring unit to the surface of the workpiece, and the spacing of this point of the workpiece relative to the measuring unit is determined from the reflection of the beam onto the image pickup. The geometric structure of the entire workpiece section within the measuring range of the system can only be calculated by a controlled deflection of the beam and evaluation of the measured results. The manufacture of such a system requires a highly accurate production of the mechanical and the optical components, as well as the use of structural parts, which are expensive and voluminous (laser light sources and optical filters). The only practical way to deflect the laser beam is by the use of a mirror. This is driven by a motor or by a galvanometer, which are additional mechanical components of high precision. The mechanical dimensions and the cost of these devices can only permit their use in special applications.

In the area of passive vision, a lot of research has been done. Especially for square vision, there are numerous methods of filtering and emphasizing of shapes, but all of these methods do not meet the requirements of automatic arc welding.

In the case of workpieces of very simple geometry, there already exists solutions. The optical width measuring system disclosed in the Loose U.S. Pat. No. 4,490,617 is capable of measuring the width of a strip. This system reduces the incoming vision data to digital values (true or false) according to the contrast of the workpiece. Therefore, the outlines of the strip must remain within the sensing area. Inherent with this method is that surface points in the second dimension are not measurable, which is absolutely necessary for arc welding.

In other words, a bent strip would result in false output data for the width. Even though it is bent, it would not be detected. This was not the intention of the inventor.

Mixed methods exist as well, which means it is possible to project an entire grid onto the surface (instead of scanning) and pick it up with two cameras, or to project in a sequence of two different grids and pick them up with just one camera. In both cases, surface points can be calculated in at least two dimensions in a quantity according to the number of the grid points. Due to the usage of a grid, these methods belong more to active vision such as disclosed in U.S. Pat. No. 3,894,802.

Electronic split image rangefinders have also been known in mirror reflex cameras (cf. "Fotoheft"—Photo Pages 8/85, pages 52 et seq. "Autofocus Popularity"). In a split image rangefinder described in this article, twin lenses from two partial images of the autofocus-measuring field are converted by a CCD. Depending on the focal position, the distance between the two partial images is a different size. The facts of whether such distance is correct and whether the image is sharp, are recognized by the autofocus computer by comparing a programmed-in signal with the signal from the image semiconductor. If these signals do not coincide, the computer calculates the required focusing distance for the correct focusing within a few thousandths of a second, and controls, with digital pulses, a setting motor. In this, and in the other conventional autofocusing systems, the problem does not involve detection of the position and geometry of a workpiece surface, but rather a sharp setting of the objective of the camera.

SUMMARY OF THE INVENTION

The invention is based on the object of providing a process of the type discussed earlier, which yields independently of the actual structure of the section of workpiece surface present in the measuring area accurate data regarding its entire geometry and position as the result of a single measurement. In this connection, the requirement must be met that the mechanical part of the measuring device can be manufactured easily with small dimensions and with a rugged construction without any individual moving parts. This can also be positioned in close proximity of a welding arc.

This has been attained according to this invention by projecting the section of a workpiece surface to be measured from two different observation points onto two image pickups, so that mutually shifted images of the same section of the workpiece surface are projected on the two image pickups. By the determination of the position and of the spacing of the chosen areas of the two images, the geometry of the workpiece surface as well as the position of the latter to the observation system is calculated.

In the process of this invention, dirty surfaces and structures of the workpiece do not constitute trouble sources, but rather enhance the function of the system. Since the workpieces are machined in the environment of the weld groove, their existence is a certainty. Furthermore, no special light source is required. It is only necessary to provide for an appropriate illumination of the workpiece, adequately present in the normal case on account of the arc and/or the lighting of the room. An additional illumination in dark rooms can be brought about without great complications, for example, by way of lightguides.

In the invention, a section of the workpiece surface; for instance, the weld seam groove in its transverse expansion, is projected by way of two optical systems that can be arranged at a specific mutual spacing, and at a fixed angle on two semi-conductor image pickups (or onto different zones of an image pickup, or in succession onto a single image pickup). In the evolving projections, all defined positions of the surface are mutually shifted depending on the distance of the surface from the two optical systems. A determination is made on each of the projections of the chosen sections and areas of the workpiece surface, resulting from different structures and illumination intensities as well as surface defects. From the positions of the images of each defined area of the surface (defect, structural variation, etc.) on the two image pickups, the position of this area is calculated to the coordinate system of the measuring device. From the position of all calculated surface points, the geometry of the entire section of the workpiece surface presented in the measuring zone is determined.

Correlation of the individual structures can also be performed, in principle, mechanically by adjustment of the optical systems, but the electronic solution is preferred since it is less complicated. Since the surface texture is to be employed for determining the total geometry, the method of derivation is utilized in addition to the correlation method.

After the geometry of the workpiece surface has been determined in the first step of the process, the system is capable of calculating in a second step additional characteristic values such as the volume of the weld groove and to feed all data for correcting the position of the welding gun and the welding parameters into a higher ranking computer.

The higher ranking computer in turn, can deliver to the sensor a model structure employed by the sensor for identification of the seam. This identification can be effected roughly by heuristic algorithms and for higher demands by variational calculus.

In other applications, the required data can be calculated and stored correspondingly and by evaluating a total of individual measurements at different positions. Information can be obtained regarding the entire surface of a workpiece.

In detail, the procedure in the method of this invention can be to picture the workpiece surface via two separate optical systems on two separate image pickups, or on two separate sectors of a combined image pickup. In this procedure, each optical system is associated with an image pickup or with a specific section of the combined image pickup.

In essence, it is only the required resolution which determines which one of these two embodiments will be the preferred. If the images of the two optical systems are projected onto two sectors of one and the same image pickup, then naturally only half the resolution can still be achieved. However, the lower marked calibrating work speaks in favor of such a strategy in as much as semi-conductor image pickups, on account of the process involved, are manufactured with accuracy, and calibration of the two images in relation to each other is eliminated. If the full resolution of the technically realized image pickups must be exploited, then two image pickup chips can be used, although, in this case they must be accurately adjusted with respect to each other.

Pickup of the images from the two optical systems by the same image pickup, could also be effected in chronological succession with the aid of a suitable arrangement of mirrors and semi-transparent mirrors. If it is ensured by a corresponding low feeding speed, in spite of images taken in chronological succession, it is still approximately the same section of the workpiece that has been pictured.

In the last-mentioned version of performing the method, the problems of mechanical calibration and lower resolution are circumvented at the cost of dynamics.

As described above, the spacing of the selected areas of the workpiece surface on the two displaced pictures is determined by plausibility calculations and/or correlation. From the positions of these images on the two image pickups, the coordinates are calculated of all selected surface points determined by a measurement. From these results, the geometry of the entire surface can also be determined in a simple way; for example, by predetermination of specific surface patterns or by a comparison with different surface patterns.

When using the correlation method for determining the sections to be correlated on the two image pickups, such correlation is preferably performed electronically (by computer). In this connection, the provision can be made that images of immediately adjacent sections of the relevant area of the workpiece surface are correlated. Again the correlation window is reduced stepwise for the resolution of a fine texture during the course of the evaluation of a measuring result.

According to another variation of the process, the procedure can be to determine the position and/or the geometry of the workpiece surface by differentiation of the light intensity function in accordance with the geometric site, formation of the value, and cross correlation.

In another embodiment of the process according to this invention it is also possible to choose an arrangement of the two optical systems for receiving the shifted images where the projection of both images takes place onto a single image pickup, which should have a nonlinear characteristic. During the mechanical, continuous or stepwise adjustment of the optical system, the different image points are brought into correlation in succession at the image pickup. The computer can recognize correlation image points and determine, from the position of the optical system known as the respective point in time, stepwise the position of the chosen surface texture in the spatial coordinate system of the measuring device.

It is advantageous in the practical performance of the process for use in connection with automatic arc welding to project only a linear section of the workpiece surface (transversely to the weld seam groove). This is accomplished by two optical systems projecting onto two separate linear image pickups (or onto two sectors of a combined image pickup, which sectors are separated for evaluation; or with a chronological shift onto the same image pickup). Then from the positions of the images of corresponding surface points on the two shifted image lines, the position of these points of the workpiece surface is calculated. Then from all calculated individual points, the profile and position of the weld groove is determined. On account of the advancing movement and measurements repeated at intervals, the welding torch and the measuring system, by evaluation of the individual measuring results, can be positioned at the beginning of the weld groove. The system is made to follow the course of the groove while welding is being executed. The welding parameters can be controlled in correspondence with the measured groove profile. By a short term change of the position of the measuring device within long interval periods, it is likewise possible during this procedure to examine the technological result (dimension, position and configuration and of the weld seam) and during continued control, to optionally consider correction factors.

Such a measuring and control installation can also be utilized for many other technical tasks with many advantages. Of course, as an alternative of this step-by-step method, it is also possible to project all at once the relevant region of the workpiece, or large sections of the same; as well as to determine by calculations the position of all chosen points of the workpiece surface.

The measuring principle with linear image pickups, also offers the decisive advantage when utilized in the close proximity of a welding arc that the optical systems are arranged behind a narrow slot of the housing; therefore, it can be protected against welding spatter. This slot can be kept free of dirt by blowing it out with a protective gas, or using compressed air at intervals between the welding steps.

Depending on the various image pickups, one should choose different methods to evaluate the output data in order to get good measuring results. The illumination of the workpiece may be variable, this can be due to the light in the room, additional lighting or due to the arc itself. Best suited are sensors that offer an integral behavior incorporating the impinging light. Thus, an image of average brightness can be obtained even at extreme fluctuations of the light intensity by different long imaging periods. Control of the imaging duration can be effected directly by the amount of light that impinges in the respective case. Using other sensors with no integral behavior, the total of several measurements can be formed and utilized for evaluation. The total may be formed by an integrated algorithm.

BRIEF DESCRIPTION OF THE FIGURES

The process of this invention will be described in greater detail below with reference to the drawings, for the case of a linear image pickup. In case of two-dimensional image pickups, the process strategy remains the same. The individual calculations then are expanded to two dimensions. In the drawings.

DETAILED DESCRIPTION

Figures 1, 2:
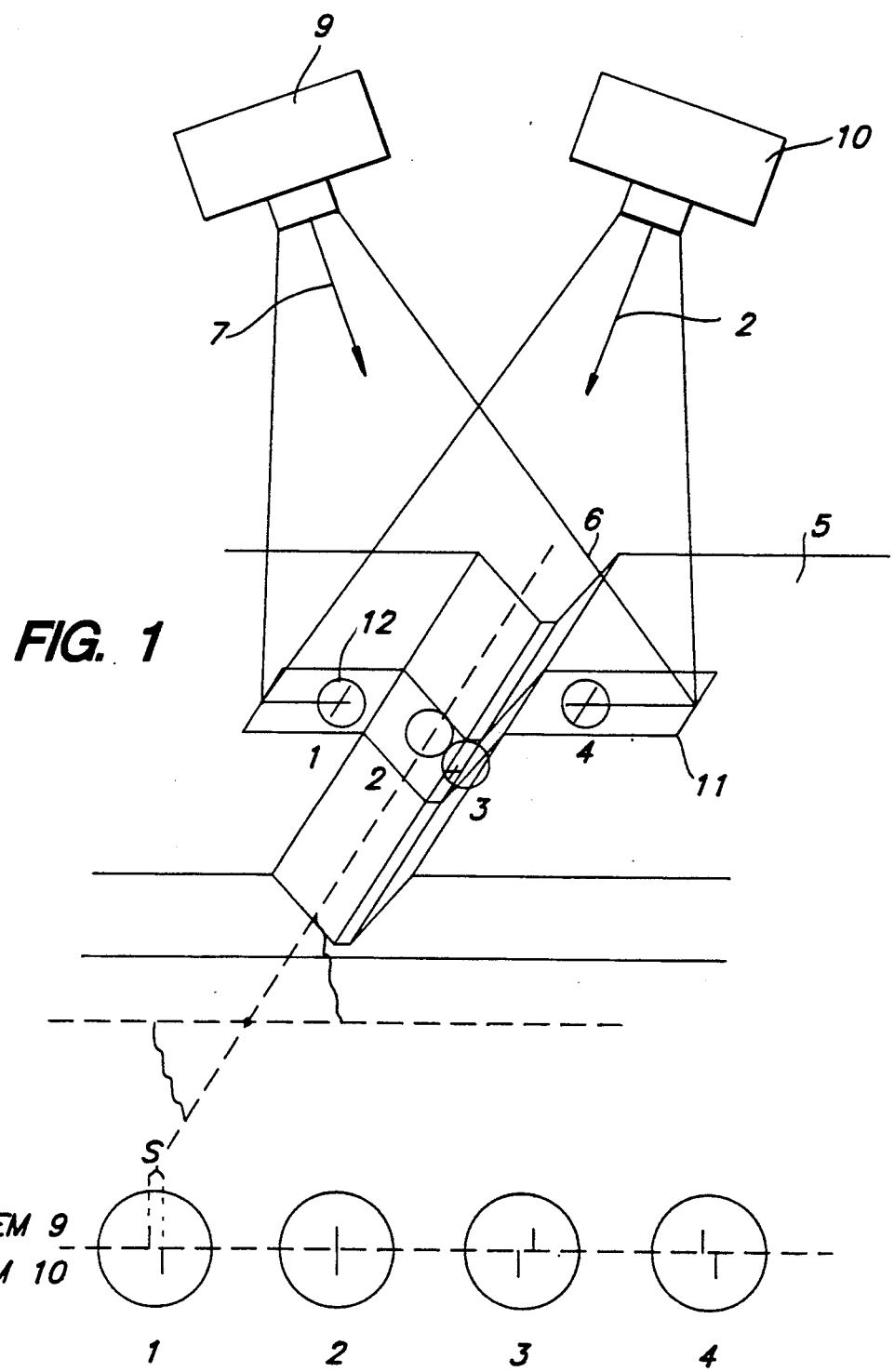
FIG. 1 shows in a schematic representation, the arrangement in principle when conducting the process of this invention.
FIG. 2 shows different images obtained while performing the process of this invention.

It can be seen from FIG. 1 that workpiece 5 where a groove 6 (weld groove) is provided, is viewed by two optical systems, 9 and 10 at converging viewing directions (arrows 7 and 8). In this arrangement, the optical systems 9 and 10 view line 11 of the surface of workpiece 5 extending transversely to the weld groove 6; the sections 1 through 4 being imaged in succession. In the embodiment chosen in FIG. 1, it is assumed that the selected structure 12 of the workpiece surface is present in each section 1 through 4.

The two optical systems 9 and 10 display on the image pickups of 13 and 14 (FIG. 5) associated images of the sections 1 through 4. The chosen structure 12 is image shifted with respect to one another. The spacing of the two images of structure 12 is a measure for the distance of the structure from a previously selected neutral plane 6. It can be seen that, in section 2 of FIG. 2, the spacing s is equal to zero since the structure 12 in section 2 of the workpiece surface lies in the neutral plane.

Figure 5:
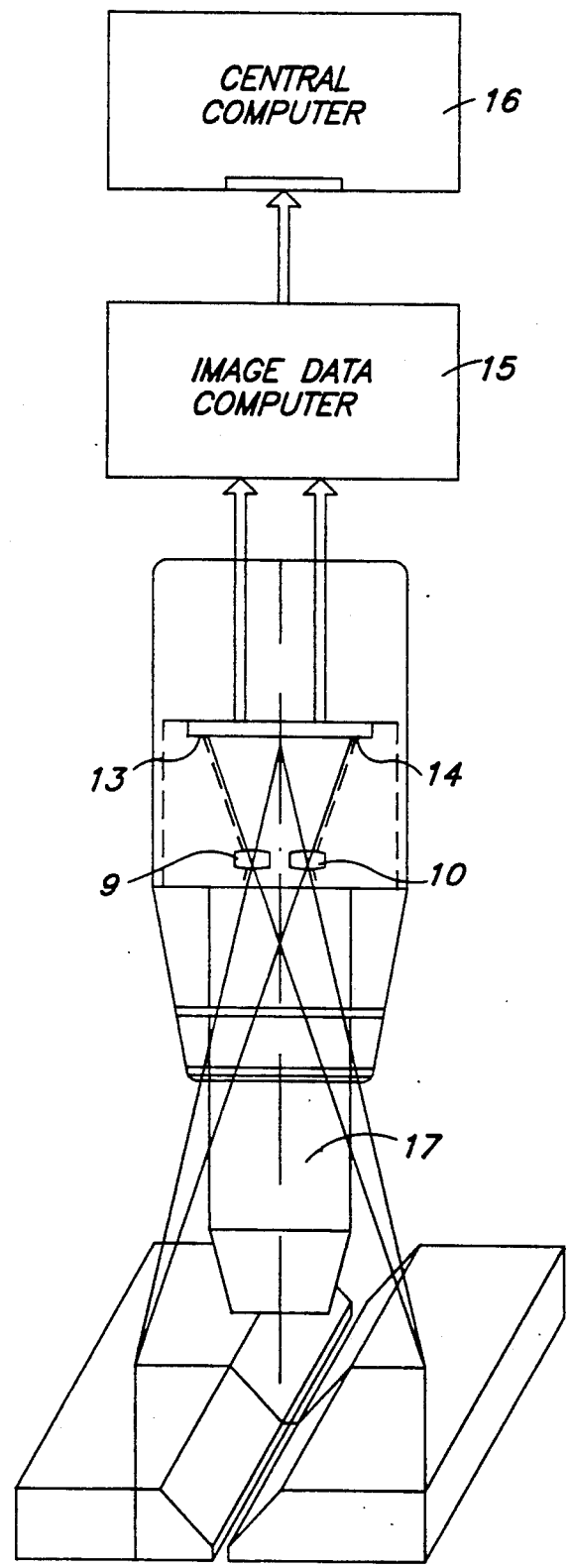
FIG. 5 shows a total arrangement for performing the process of this invention.

The image pickups 13 and 14 are schematically indicated in FIG. 5. There can be rows of photodiodes which feed image data to the image data computer 15 executing the correlation. The image data computer 15 transfers the determined geometrical data regarding the surface of the workpiece 5 to the central computer 16. The central computer evaluates this data for correction of the track along which a welding gun 17 is moved, and of the welding parameters.

Figure 6:
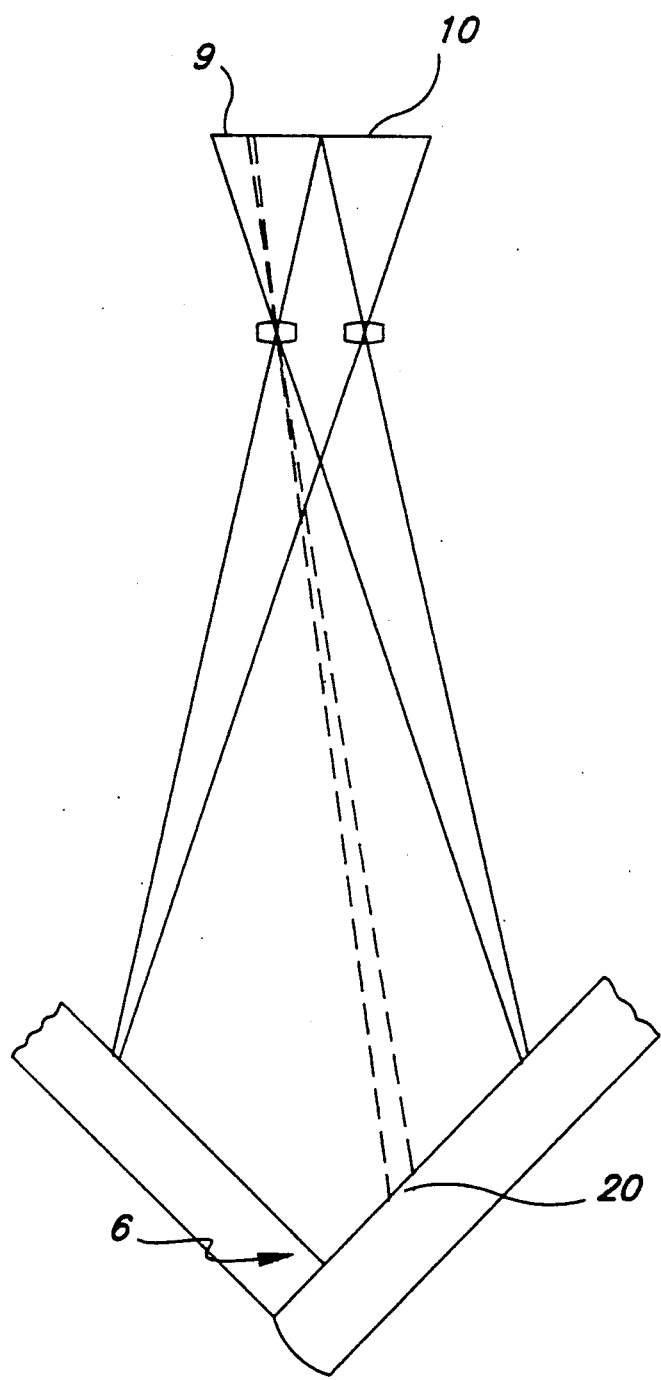
FIG. 6 is a schematic representation of the cross correlation method according to the invention.
Figure 7:
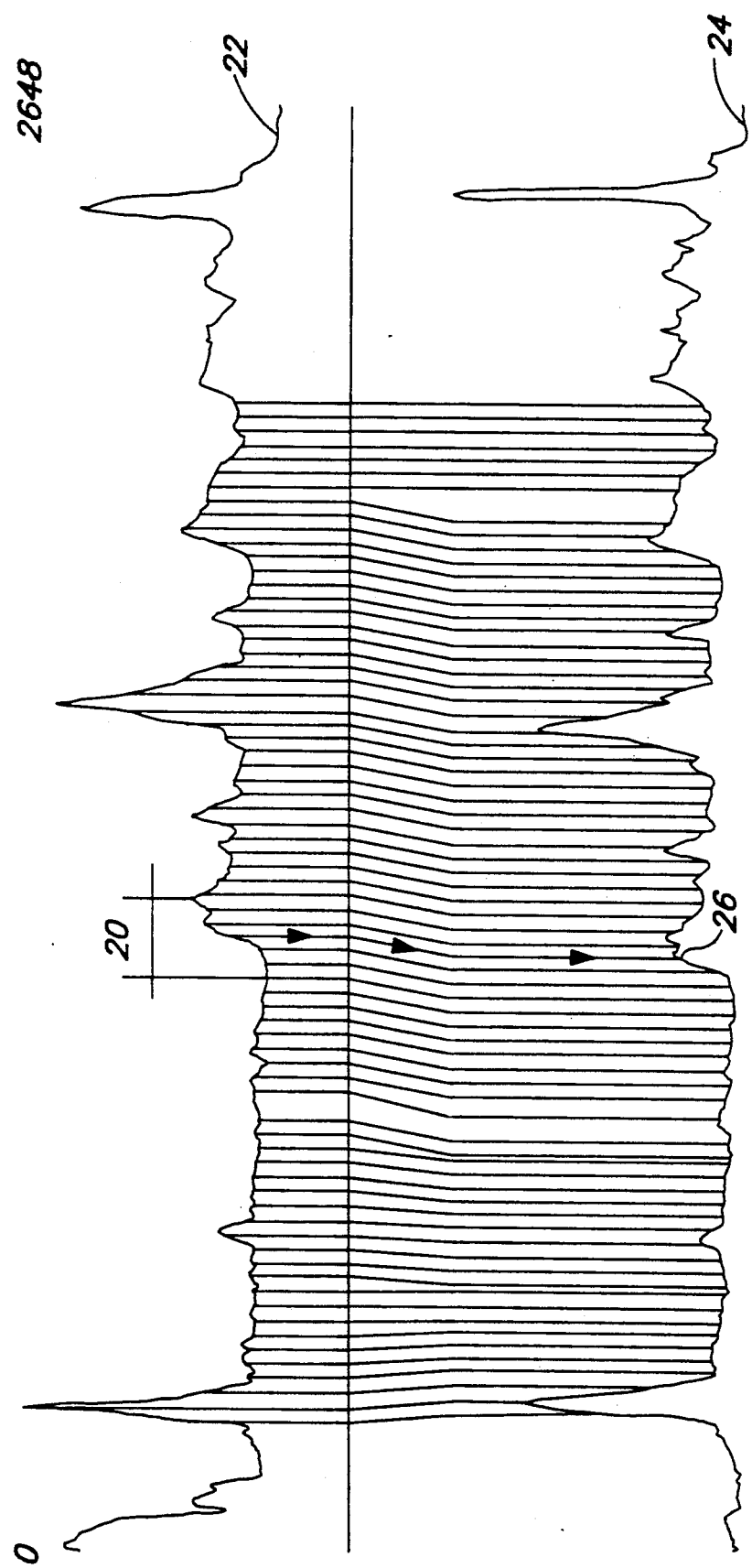
FIG. 7 is a graphical illustration of the images obtained using the method of FIG. 6.

Determination of the positions of the chosen points of the surface on the two image pickups, can also be effected in this process by a correlation method. In the latter, the images of the texture detected on the image pickups are made to be congruent by cross correlation as shown in FIGS. 6 and 7. Adjacent the weld groove 6, an interval 20 is selected according to a measured surface point. That is, the position of the images of the detected texture is determined in the coordinate system of the measuring unit. In this connection, it is possible to effect the resolution of the structures of any desired smallness by a corresponding reduction of the correlation window.

By consequent continuation of the procedure described above, from left to right of the light intensity function, the system generates an array of surface points scaled in its own coordinate system.

FIG. 7 illustrates a graph of the light intensity 22 of the left detector and the light intensity 24 of the right detector. The selected interval 20 on the left sensor is translated to a corresponding point 26 on the right sensor.

Figure 8:
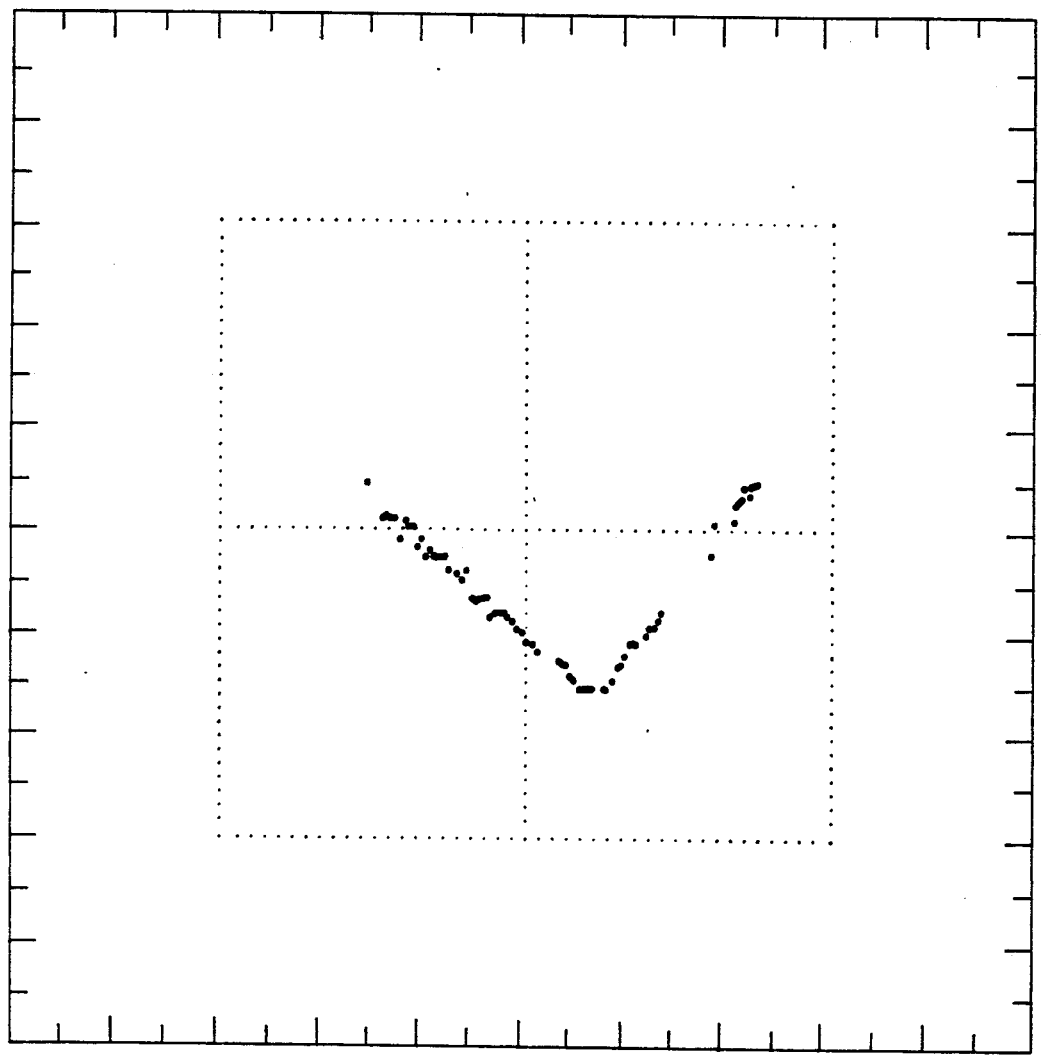
FIG. 8 is a plot of the calculated surface points obtained using the method of FIG. 6.

Another version regarding determination of corresponding points, would be the method of parameter integration. For example, the function of the total squared errors which must assume a minimum for the case of "found". The term "found" means that by the stepwise shifting of the two light intensity functions with respect to each other, a selected interval has been brought into optimum congruence. It is possible to determine directly from the extent of the shift, by the elementary laws of mathematics (intercept theory), the position and distance with respect to the sensor coordinate system of the measuring device. FIG. 8 illustrates a plot of the calculated surface points as a result of the procedure described above with reference to FIGS. 6 and 7.

Figure 3A:
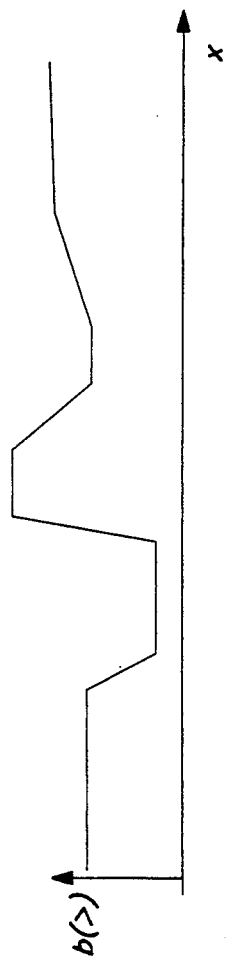
FIGS. 3a-3c and 4 show various diagrams obtained during the course of cross-correlation with the use of the light intensity function.
Figure 3B:
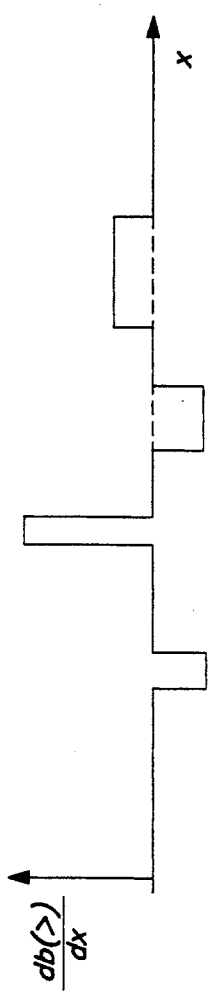
Figure 3C:
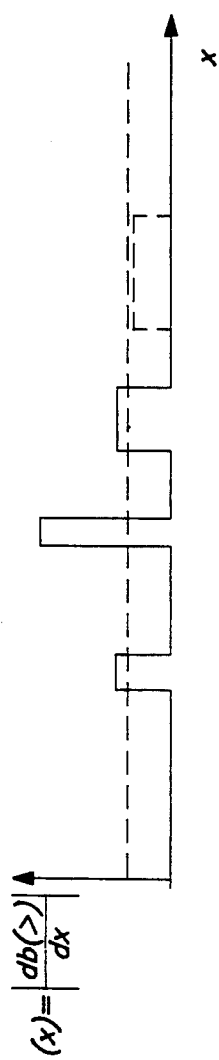
Figure 4:
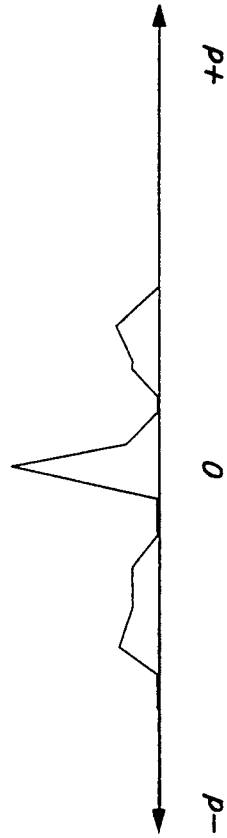

Evaluation of the data transmitted by the image pickups is explained with reference to FIGS. 3 and 4; using as an example the cross-correlation with the use of the light intensity function [b(x)]. FIG. 3a shows a diagram where the light intensity function b(x) is plotted against the geometrical site x. By differentiation db(x)/dx in FIG. 3b, and formation of the absolute value, the function h(x) is obtained in FIG. 3c. Thus by differentiation, formation of the amount, and use of a threshold value, defined structures of the workpiece surface are worked out, while other structures are suppressed. This is executed for the image pickups 13 and 14, fed by the optical systems 9 and 10, obtaining functions h(x) and h(x+$\alpha$) shifted by the distance of the two images with respect to each other. By correlating these two functions h(x) and h(x+$\alpha$), the cross correlation function H(x) is obtained as illustrated in FIG. 4. This cross-correlation function H(x) is then searched for the largest extreme value which later then corresponds to a selected structure, for example an edge of the workpiece surface.

What is claimed is:

1. A process for determining the positioning and geometry of workpiece surfaces, comprising the steps of
    (a) imaging successive regions of the workpiece surface, as observed from two different observation points, onto adjacent sectors of a single combined image pickup so that mutually shifted images of each region of the workpiece surface are projected on the combined image pickup, each said region extending transversely across a welding seam extending along the workpiece surfaces and said combined image pickup being received within a casing;
    (b) determining in each of the shifted images the defined image points which result from projection of light on the surface texture and defects in the workpiece surface, each image of a selected point on the workpiece surface being on one sector of the combined image pickup and being associated with the corresponding image on the adjacent sector of the image pickup;
    (c) calculating the position of the points of a predetermined area of the workpiece surface within the spatial coordinate system of the image pickup in accordance with the position of the image points on the two adjacent sectors, whereby the position of the individually defined points on the workpiece surface, the entire geometry of the observed workpiece surface, and the position of the points relative to the observation system may be determined; and
    (d) moving said casing along the welding seam together with a welding torch, thereby to perform said imaging step (a) on successive regions of the welding seam during a welding operation.

2. A process as defined in claim 1, wherein the workpiece surface is projected by way of two separate optical systems onto said combined image pickup.

3. A process as defined in claim 2, wherein said imaging step is performed using a measuring device comprising said combined image pickup and said two separate optical systems disposed within said casing.

4. A process as defined in claim 3, wherein the casing defined a narrow slot behind which said combined image pickup and said two separator optical systems are disposed, thereby to protect the pickup and optical systems from welding spatter.

5. A process as defined in claim 1, wherein the light intensity values generated on the combined image pickup are preliminarily processed by differentiation and subsequent threshold value comparison in accordance with predetermined image points.

6. A process as defined in claim 1, wherein corresponding points of the two images are located by an electronic computer by one of heuristic principles and the mathematical methods of correlation and parameter integration.

7. A process as defined in claim 1, wherein the structure of the entire surface lying in the measuring zone, is determined from the calculated positions of the selected surface points in an electronic computer simulated structures being derived and identification of the structures being effected by filtering, differentiation to determine edge positions and planes, and by variational calculus.

8. A process as defined in claim 1, and further comprising the step of determining the geometry of relatively large sections of the workpiece surface and of the entire workpiece from the results of several chronologically and spatially successive measuring cycles.

9. A process as defined in claim 1, wherein the workpiece surface is illuminated by the arc from an arc welding device and external light is utilized for illumination in operating conditions when the arc is not lit up.

10. A process as defined in claim 1, wherein each pickup period is regulated so that the image pickup remains exposed until the desired average amount of light has been impinged upon, the directly successive pictures taken with the same duration of time being added to obtain light intensity functions that can be evaluated.

11. A process as defined in claim 1, wherein the workpiece surface is illuminated with an irregular grid.

* * * * *